(12) United States Patent
Van Megchelen

(10) Patent No.: US 8,856,871 B2
(45) Date of Patent: Oct. 7, 2014

(54) METHOD AND SYSTEM FOR COMPILING A UNIQUE SAMPLE CODE FOR SPECIFIC WEB CONTENT

(75) Inventor: Oedses Klaas Van Megchelen, Ede (NL)

(73) Assignee: Van Megchelen & Tilanus B.V., Ede (NL)

( * ) Notice: Subject to any disclaimer, the term of this patent is extended or adjusted under 35 U.S.C. 154(b) by 0 days.

(21) Appl. No.: 12/989,646

(22) PCT Filed: May 20, 2010

(86) PCT No.: PCT/NL2010/050304
§ 371 (c)(1),
(2), (4) Date: May 11, 2011

(87) PCT Pub. No.: WO2011/145922
PCT Pub. Date: Nov. 24, 2011

(65) Prior Publication Data
US 2013/0074148 A1    Mar. 21, 2013

(51) Int. Cl.
*G06F 17/30* (2006.01)
(52) U.S. Cl.
CPC .............................. *G06F 17/30876* (2013.01); *G06F 17/30887* (2013.01)
USPC ........................................................... 726/2
(58) Field of Classification Search
CPC ................................................ G06F 17/30887
USPC ............................................................ 726/2
See application file for complete search history.

(56) References Cited

U.S. PATENT DOCUMENTS

| | | | |
|---|---|---|---|
| 6,701,369 B1 | 3/2004 | Philyaw | |
| 7,341,191 B2 | 3/2008 | Russell et al. | |
| 7,578,432 B2 | 8/2009 | Libin et al. | |
| 2001/0030234 A1 | 10/2001 | Wiklof | |
| 2006/0011720 A1 | 1/2006 | Call | |
| 2007/0094304 A1* | 4/2007 | Horner et al. | 707/104.1 |
| 2008/0245870 A1 | 10/2008 | Lee et al. | |
| 2009/0028417 A1 | 1/2009 | Floeder et al. | |

FOREIGN PATENT DOCUMENTS

| | | |
|---|---|---|
| EP | 1043670 A2 | 10/2000 |
| EP | 1043670 A3 | 4/2002 |
| EP | 1047004 A2 | 10/2010 |
| WO | WO 98/24036 A1 | 6/1998 |
| WO | WO 00/16211 A1 | 3/2000 |
| WO | PCT-NL-2010-050304 | 5/2010 |

(Continued)

OTHER PUBLICATIONS

Berners-Lee, et al. Uniform resource identifier (URI): generic syntax. Internet engineering task force. 2005.

(Continued)

*Primary Examiner* — Jacob Lipman
(74) *Attorney, Agent, or Firm* — The Webb Law Firm, P.C.

(57) ABSTRACT

Methods for compiling a unique sample code for specific web content. Methods for providing specific web content with such a unique sample code. Methods for gaining access to specific web content provided with such a unique sample code. Methods for indexing web content in a search engine. Methods of processing an Internet search query using a search engine having indexed web content. Related index repositories. Methods for gaining access to specific web content provided with a unique sample code by using a searching engine having indexed web content.

23 Claims, 10 Drawing Sheets

Index Repository:

| Index No. | Sample code  10 | Search? | Time Stamp | Label |
|---|---|---|---|---|
| 1 | cnn.com<br>news.google.com<br>patent_statistics_for_decision_makers_2010<br>4 | √<br>√<br>√<br>- | May 16, 2010<br>12:53 | 157.166.224.25 |
| 2 | games.com<br>cheap<br>PS3<br>2010 | √<br>√<br>√<br>√ | May 17, 2010<br>1:12 | (none) |
| 3 | www.sportshoes.com<br>hiking4<br>manufacture<br>countryC<br>townT<br>2010 | √<br>√<br>√<br>√<br>√<br>√ | May 18, 2010<br>8:43 | 82.94.214.144 |
| Etc | | | | |

(56) References Cited

FOREIGN PATENT DOCUMENTS

| WO | WO 2010/134802 A1 | 11/2010 |
| WO | WO 2010/134812 A1 | 11/2010 |
| WO | WO 2010/134813 A1 | 11/2010 |

OTHER PUBLICATIONS

Bide. In search of the unicorn: the digital object identifier from a user perspective. BNBRF report 89. 1998; 1-36.

Kindberg, et al. The tag URI scheme and URI namespace. World wide web consortium. 2002.

Kindberg, et al. Towards a real-world wide web. Internet and mobile systems laboratory. 2000.

Paskin, et al. The doi URI scheme for the digital object identifier. Internet engineering task force. 2003.

Rekimoto, et al. Cybercode: designing augmented reality environments with visual tags. Proceedings of DARE. 2000.

* cited by examiner

Index Repository:

| Index No. | Sample code | Search? | Time Stamp | Label |
|---|---|---|---|---|
| 1 | cnn.com<br>news.google.com<br>patent_statistics_for_decision_makers_2010<br>4 | ✓<br>✓<br>✓<br>— | May 16, 2010<br>12:53 | 157.166.224.25 |
| 2 | games.com<br>cheap<br>PS3<br>2010 | ✓<br>✓<br>✓ | May 17, 2010<br>1:12 | (none) |
| 3 | www.sportshoes.com<br>hiking4<br>manufacture<br>countryC<br>townT<br>2010 | ✓<br>✓<br>✓<br>✓<br>✓ | May 18, 2010<br>8:43 | 82.94.214.144 |
| Etc | | | | |

Sample code 10

METHOD AND SYSTEM FOR COMPILING A UNIQUE SAMPLE CODE FOR SPECIFIC WEB CONTENT

This application claims priority to PCT/NL2010/050304 filed May 20, 2010, which is hereby incorporated herein by reference.

BACKGROUND

Some embodiments described herein relate to a method for compiling a unique sample code for specific web content. Some embodiments described herein also relate to a method for providing specific web content with such a unique sample code. Some embodiments described herein further relate to a method for gaining access to specific web content provided with such a unique sample code. Some embodiments described herein moreover relate to a method for indexing web content in a search engine. Some embodiments described herein additionally relate to a method of processing an Internet search query using a search engine having indexed web content according to the above method. Some embodiments described herein further relate to an index repository for use in the above method. Some embodiments described herein also relate to a method for gaining access to specific web content provided with a unique sample code by using a search engine having index web content according to the above method. Some embodiments described herein also relate to a computer-readable medium with computer-executable instructions which, when loaded onto a computer system, provide the computer system with the functionality of any of the aforementioned methods. Some embodiments described herein additionally relate to a sample code as compiled by the above method. Some embodiments described herein further relate to a system for compiling a unique sample code using the above method. Some embodiments described herein also relate to a system for handling a user's request for gaining access to specific web content provided with a sample code according to some embodiments.

Internet users wishing to retrieve information from the world wide web (WWW) will often submit a query containing search words to an Internet search engine. Such a search engine will provide a user with a result list of websites, or items contained in websites, in response to a query from the user. A result list will contain references to websites, or parts of websites, which the search engine considers match the search terms. The match can be an exact match, or provision can be made for the search engine to provide near matches, near matches being determined by truncations, letter transpositions or letter replacements within the search terms. The result list is sorted based on how well web pages match the query and respective ranks associated with matching pages.

In order to obtain the information needed to be able to provide a user with a result list in response to a query, most search engines use computer programs called web crawlers or spiders to search the Internet, downloading web pages from servers. It is not possible, due to constraints in communication bandwidth and computing resources, for a web crawler to download every web page on the world wide web. Necessarily, search engines only search a subset of web pages. A number of different search prioritisation methods, such as breadth first searching, may be used to ensure that the most valuable pages are downloaded as efficiently as possible. Typically the downloaded pages are stored temporarily, in a memory device such as for example a server's read only memory, to be processed by the search engine for indexing.

In order to produce an index for use by a search engine in responding to a user's query, the information from downloaded web pages is compressed, sorted and stored. Typically the downloaded pages are stored temporarily, in a memory device to be processed by the search engine for indexing. The downloaded pages are then parsed and processed. Processing the information includes extracting words contained within the pages as well as the number of occurrences of the words, their location in the pages, font size and the like. Processing the information also includes extracting hypertext links included in the web pages. The processed information from a web page is stored such that it can be addressed according to the words contained within the page. The stored information is also used to rank the page, that is, to quantify how useful the page will be to a user based on the search terms of a query.

In order to rank the matches to a query, ranking algorithms are used which are usually based on simple link analysis techniques. These algorithms include HitList and Google's PageRank. The aim of these algorithms is to rank a page based on a measure of the page's authority using a mechanism based on the number of links to the page from other pages. The underlying assumption with such a ranking is that many Internet users will choose to incorporate in their web pages links to relevant or authoritative web pages.

A problem associated with link-based ranking algorithms such as PageRank™ is that it is possible for a website designer to employ techniques which capitalise on their knowledge of search engine link analysis algorithms in order to improve the rank of their website artificially. Such techniques are often referred to as "spamming" and the web pages which are the target of spamming techniques are known as "spam" web pages. For example, spamming techniques include creating numerous web pages for the sole purpose of linking to a target (spam) web page and thereby raising the ranking of that web page. This spam technique is commonly referred to as link farming. Another problem with the known search engines is that no distinction can be made nor is made between authentic web content published by the originating party and counterfeit web content published by malicious parties which easily leads to deception of the public.

An embodiment includes a method by means of which at least one of the problems above is solved.

To this end, embodiments provide a method for compiling a unique sample code for specific web content, comprising: A) defining at least one sample code template comprising multiple sample code segments to be used for building a sample code for specific web content, said sample code segments at least comprising: a sample owner identifying code segment, and a sample identifying code segment; B) specifying the content of the sample code segments to be used for building said sample code, wherein the sample owner identifying code segment is specified by an Internet address, in particular an IP address and/or a domain name, of an owner of the specific web content, C) stringing the specified sample code segments to form the sample code, D) defining a digital path to a digital location via which access can be gained to the specific web content, and E) creating a cross-reference between the sample code generated during step C) and the digital path defined during step D) in case the sample code and the digital path are mutually distinctive.

In some embodiments, the digital path may represent a Uniform Resource Locator, or may refer to a digital location, in particular, a web location, where the specific web content is stored. In other embodiments, at least a part of the digital part and the sample code are identical or may be substantially identical. In some embodiments, in Step A at least one punctuation mark may be defined for separating adjacent code sections during step C). In other embodiments, an order of defined code segments to be stringed may be defined in Step A. Other embodiments may provide that Step A be processed repeatedly to generate multiple sample code templates, wherein the method further comprises step I) comprising choosing a code template to be applied prior to executing step B.

By labelling each world-wide unique specific web content with a world-wide unique product sample code acting as world-wide unique identifier, comparable with a DNA profile or fingerprint of the sample, one specific web content can be traced and distinguished easily and unambiguously from another specific item of web content, and thus each specific web content can be identified throughout the world regardless of its context. This world-wide unique identification can be facilitated by the recognizable (identifiable) incorporation of the IP address and/or the domain name of a (present or prior) owner of the specific web content. Moreover, since the specific web content code is associated with a digital path to a digital location where the specific web content, and eventual further information (metadata) relating to said specific web content, is stored and can be traced/found, it can be verified relatively easily whether the specific web content has been manipulated or is authentic. This may facilitate assessment of the authenticity of the specific web content by determining the identity of the publisher of the specific web content. If the specific web content is published by the owner of the specific web content, the web content is deemed to be authentic. However, if the specific web content is not published by the owner, the specific web content is not considered to be authentic. The specific web content will typically not be moved once stored at the digital location. If the specific web content is moved to another digital or physical location, the cross-reference between the sample code and the digital path may be correspondingly updated, so the sample code is up to date and gives permanent access to the specific web content. Hence, dead links due to changes of the digital paths to digital locations where specific web contents are stored can be eliminated in this manner.

Specific web content, also considered as a single individual digital entity, are defined to have a unique identity and to be distinguishable (individualizable) and hence trackable and traceable from other specific web content in the scope of its specification criteria. The term "specific web content" is understood as a web item or piece of web content represented by textual, visual or aural content that is encountered as part of the user experience on websites, which, by way of non-limiting example, may include text, images, sounds, videos and animations.

The term "owner" may include the originator, publisher, distributor, author, and creator, provided that an actual or previous ownership of the specific web content can be deduced from the IP address and/or the domain name of the owner as used and visualized in the sample code itself. The term "digital location" refers to a web location which can be a location on a computer of the owner as the code issuing party which is connected to the Internet, though it can also be a remote location in a private or public cloud computing infrastructure employing Internet-based computing, whereby shared resources, software and information are provided to computers and other devices on-demand, similar to a public utility. The sample codes may be stored in a computing cloud, while the specific web contents are stored in a location separate from the computing cloud, which would reduce the traffic load within the cloud and may also be beneficial for security reasons.

Each unique piece of web content is marked with a world-wide unique sample code. This sample code not only facilitates differentiation between authentic web content and non-authentic web content, but also incorporates metadata relating to the content of the specific web content. This metadata may be stored as a web index file in an index repository for use by a search engine in responding to a user's query. Since the size of the metadata incorporated in a sample code is commonly considerably smaller than the size of usual (meta)data of web content to be indexed, indexing of web content can take place more concisely and more efficiently and can accelerate the speed of handling a search query and hence the Internet traffic load. This can lead to energy savings, which is favourable both from an economic and environmental point of view.

The sample code segments are selectively ordered to build an identifying path referring either directly or indirectly to a digital location, in particular a web location, where the specific web content can be found. The digital path may commonly represent a Uniform Resource Locator (URL) which may (automatically) be provided with a prefix, such as http, https, ftp, ftps, mailto, file, by a web browser. In an embodiment, at least a part of the digital path is identical to the sample code, meaning that the sample code is incorporated in the digital path. In case the sample code and the digital path are substantially identical, creating a cross-reference in accordance with step E) may be omitted. In this respect, the term "substantially identical" is being used to show that there may be minor differences between the sample code and the digital path which do not have any effect in practice. For example, although the digital path will commonly have a prefix, such as "http://", such a prefix may not be present in the visualized sample code itself. However, since most web browsers will normally add a prefix in front of a web address not already having such a prefix, the sample code as such may easily be used as web address (digital path) leading to a web location (digital location) where the requested specific web content is stored.

In an embodiment, the method includes step F) comprising storing the sample code, the digital path, and the cross-reference between the sample code and the digital path in a database. Storing the cross-reference as a link between the sample code and the digital path can facilitate translating the sample code into a digital path where the specific web content can be found. Moreover, storage of this data may facilitate updating the cross-references in case of a change of the digital path in order to prevent unlinking (dead linking) of the sample code with respect to the actual location where the specific web content is stored and can be traced and found.

The method optionally comprises step G) comprising converting the sample code generated during step C) into a machine-readable format. If the sample code is printed or displayed on a screen, the sample code may be read, for example, by using an optical scanner. By applying optical character recognition, the scanned sample code can be converted into a set of characters identical to the sample string of the sample code, which can subsequently be entered either automatically or manually into a web browser. The machine-readable sample code may also be represented in a digital or physical encrypted iconographic format, such as a 2D/3D barcode and/or a RFID tag. It should be noted that while these iconographic representations look similar to conventional iconographic representations, the content, meaning, and use of the iconographic representation of the sample code is completely different from the conventional iconographic representation of known sample series and/or categories codes.

Alternatively, the method comprises step H) comprising translating at least the sample identifying code segment of the sample code into another language and matching characters. Since the sample identifying code segment may comprise metadata relating to the specific web content associated with the sample code, the metadata providing relevant recognizable information about the specific web content, it may be user-friendly to offer and display these metadata in the language of the location/country where the specific web content code is issued. An example of possible metadata incorporated and named in the at least one sample identifying code segment is information relating to the author, title, subject, keywords, size, version, date of creation, remarks, and/or status of the specific web content. The IP address and/or the domain name of an owner as incorporated in the owner identifying code segment is commonly not translated and commonly remains unchanged during step H).

It is further imaginable that the sample code string comprises at least one intermediary identifying code segment relating to the identity of an intermediary e.g., used to manufacture, supply, support, distribute, sell, and/or promote the product sample. The intermediary identifying code segment, optionally based on the domain name or IP address of the intermediary, may comprise the identity of the intermediary but may also comprise other metadata relating to the intermediary, such as a platform or service offered to the public via which specific web content can be accessed. One example is related to the distribution of news via a news publishing service, such as Google News (news.google.com), via which news items originating from different sources are displayed. A sample code associated with a specific web content may be represented as follows: "cnn.com/google.com/2010_05_18/federal_government_extends_area_of_fishing_ban_in_Gulf_of_Mexico_due_to_enormous_oil_spill_in_the_coastal_waters", wherein "cnn.com" represents the owner identifying code segment, "google.com" represents the intermediary identifying segment, "2010_05_18" represents the publication date (May 18, 2010), and "federal_government_extends_area_of_fishing_ban_in_Gulf_of_Mexico_due_to_enormous_oil_spill_in_the_coastal_waters" represents metadata relating to content of the specific web content, in which metadata serves as (a set of) keywords taken into account during processing of a user's search query. The sample code forms a web link which either directly or indirectly leads to the web content associated with said sample code. Hence the above sample code itself may refer to the digital location where the web content is published (direct routing), though it may also be conceivable that the above sample code may be automatically translated (by means of a script) into a cross-referenced digital path to the digital location where the web content is stored (indirect routing). An example of such a cross-referenced digital path is the URL: "http://edition.cnn.com/2010/US/05/18/gulf.oil.spill.main/index.html?hpt=T2".

It may be beneficial during step A) to define at least one punctuation mark for separating adjacent code segments during step C). A variety of punctuation marks can be used, though since the sample code often functions as URL, a slash ('/') sign may be used to separate adjacent code segments. In a correct URL syntax commonly a slash sign is also positioned behind the last code segment. In addition to these separation characters, other typographic signs, such as a tilde ('~'), a dot ('.'), an underscore ('_'), and a minus sign ('-'), may also be used within the code segments themselves and/or between the code segments. Such a punctuation mark may be recognized by the search index, as a result of which the sample code can be decomposed by the search engine into multiple code segments forming the indexed metadata (to be) stored in the index repository.

In an embodiment, the sample code string comprises at least one checking code segment representing the result of a predetermined mathematical processing of at least one other sample code segment. The algorithm used to calculate the value of the checking code segment may be defined when defining the sample code structure during compilation of the sample code. This algorithm may for example use or have similarities with the ISBN (International Standard Book Number) category coding system. The algorithm for generating an ISBN check character works as follows. To generate an ISBN check character, each ISBN digit is multiplied by a predetermined associated weighting factor and the resulting products are added together. The weighting factors for the first nine digits begin with 10 and form the descending series 10, 9, 8 . . . 2. Thus for the nine digits 0 9 4 0 0 1 6 3 3, the products summed are 0+81+32+0+0+5+24+9+6=157. This sum is divided by the number 11. (157/11=14 with 3 remainder). The remainder, if any, is subtracted from 11 to get the check digit. (11−3=8). If the check digit is 10, it is represented by the Roman numeral X. The final ISBN in this example is accordingly 0-940016-33-8. By generating the check digit and comparing it with the received check digit, the validity of the ISBN may be verified. As mentioned above, a similar or comparable check may be incorporated in the sample code.

In another embodiment the sample code segments defined during step A) further comprises a sample code security identifying code segment. Application of this code segment may counteract abuse of the sample code by parties with malicious intent, since this security identifying code segment may be used as a check to determine the authenticity of the sample code. For example, after entering the sample code into a web browser, a validity check of the sample code security identifying code segment may be performed. This security related code segment may be time-dependent ("dynamic"), meaning that the code segment may only be valid for a limited period of time. In case the security check shows that the sample code is no longer valid or in force, access to the specific web content will not be granted. The security identifying code segment hence acts as an interactive key to gain access to the specific web content file.

During step A) not only the number and kind of the code segments used to build a code may be defined, but also the order of defined code segments to be stringed may also be defined. This allows for creation of a complete sample code template (code format), wherein code segments are ordered in a predetermined order. Determining the order of code segments during step A) can enhance the handling of sample codes and co-related storage locations of the specific web contents.

In an embodiment, step A) may be repeatedly performed to generate multiple sample code templates, wherein the method further comprises step I) comprising choosing a code template to be applied prior to executing step B). Generating multiple templates may allow for additional differentiation in sample codes provided to users. For example, a party may offer specific web content directly to customers and also indirectly to customers by making use of an intermediary. In doing so, different sample code templates may be used, where the direct customers may receive a code such as "www.owner.com/sample_id_1234" which does not use an intermediary, while indirect customers may receive a code such as "www.owner.com/intermediary.com/sample_id_5678" which utilizes an intermediary.

The aforementioned method may be performed using a software module having a user interface to allow the user to generate a world-wide unique sample code.

An embodiment also relates to a method for providing specific web content with a unique sample code, comprising: J) creating specific web content, K) compiling a unique sample code for the specific web content according to the method described above, L) marking the specific web content with at least one compiled sample code, M) storing the specific web content at a digital location, N) storing the sample code, and O) creating a cross-reference between a digital path referring to said digital location and the sample code in case the sample code and the digital path are mutually distinctive. Marking the sample with the specific web content code according to step L) may facilitate indexing of the specific web content by a search engine. Moreover, the manner of labelling the specific web content by using the sample code can allow for assessment of the authenticity and legitimacy of the specific web content. Specific web content may optionally be labelled with multiple unique sample codes. The multiple unique sample codes may be embedded as metadata in the specific web content or may also be incorporated in a body text of the specific web content. For example, embedding multiple sample codes into one specific web content could be advantageous if the specific web content is distributed via multiple intermediaries, with each intermediary using its own unique sample code.

In an embodiment, the method may include step P) comprising providing the sample code to a user, for example the creator of the specific web content. This may be performed by sending the user an e-mail which includes the sample code. The sample code may be displayed as plain text in the body of the email which contains a hyperlink. Alternatively, the sample code may be attached as a separate attachment to the email. As the sample code is commonly represented by a string of a limited number of alphanumeric signs and punctuation marks, the sample code is commonly no larger than 1 kilobyte. Since only the sample code and not the specific web content is distributed, Internet traffic and the storage load may be significantly reduced. By storing sample codes instead of the sample files in a computing cloud, users can be offered a secure exchange of information in a cloud computing environment.

As already indicated the sample code may be embedded as metadata into the specific web content forming a tag, mark, or label of the specific web content. In an alternative embodiment, the sample code is incorporated in the content, in particular the body text, of the web content.

Some embodiments further relate to a method for indexing specific web content provided with a sample code according to the above method, comprising: i) allowing a search engine to crawl specific web content and acquiring at least one sample code coupled to said specific web content, ii) verifying the authenticity of the sample code by comparing the Internet address incorporated in the owner identifying code segment with a detected Internet address of the web content; iii) labelling sample codes found authentic during step ii); and iv) storing the samples codes acquired in an index repository. Since each sample code comprises an owner identifying code segment including an Internet address of the owner, the source, and hence the authenticity and legitimacy of the published web content can be assessed by comparing the Internet address incorporated in the sample code and the detected Internet address of the publisher of the web content. In case there is a match between both Internet addresses, it is assumed that the web content originates from the owner and is hence authentic. Labelling the sample codes according to step iii) after verification of the sample codes according to step ii) allows a distinction to be made between authentic web content and non-authentic web content, which can be used for ranking search results in response to a search query wherein authentic web content will commonly be listed higher than non-authentic web content. Hence, labelling the sample codes after verification may allow for the prioritization of search results. For this purpose, it is conceivable that either the authentic web content or the non-authentic web content is labelled, though it would also be possible that both the authentic web content and the non-authentic web content is labelled provided that a clear distinction can be made between the authentic web content and the non-authentic web content. In one example, only the authentic web content is labelled, wherein during step iii) the sample codes found authentic are labelled by the detected IP address of the web content. Since the actual IP address of an owner does commonly not change in course of time, using the IP address as a marking label may help facilitate future verification of co-related web content.

In an embodiment, the method comprises step v) comprising detecting the IP address of the web address prior to step (ii), wherein during step ii) a domain name is derived from the owner identifying part of each sample code, wherein an IP address related to said domain name is looked up by using a domain name server, wherein the looked up IP address is compared with the detected IP address according to step v). An IP address comparison may be one method that can be used to verify the origin and hence the authenticity of the specific web content. Thus, during step iii) the sample codes found authentic may be labelled by a detected IP address of the web content.

In an embodiment, during step iv) the sample codes stored in the index repository are provided with a time stamp. Providing each indexed sample code with a time stamp facilitates chronological ranking of search results.

In another embodiment each sample code is decomposed in separate code segments, wherein during step iv) the sample codes are stored in decomposed format. Decomposition of the sample code into separated code segments may improve the efficiency during processing of a search query, since the code segments can be searched selectively, wherein other code segments can be disregarded during processing of a search query, leading to savings of time and energy. For example, if the sample code comprises a code security identifying code segment and/or a checking code segment as defined above, these code segments can be disregarded by the search engine.

Some embodiments described herein moreover relate to a method of processing an Internet search query using a search engine having indexed web content according to the above method, comprising: vi) receiving a search query comprising at least one keyword, vii) searching the sample codes stored in the index repository for the at least one keyword, and viii) in case the at least one keyword matches at least a part of at least one sample code stored in the index repository, providing the at least one matching sample codes as search results. In case the sample codes are stored in decomposed format in the index repository, it is imaginable that the code segments are searched selectively during step vii). The search results are based upon the extent of matching of the keywords (search criteria) entered by a user and the metadata incorporated in the sample codes as stored in the index repository. During step viii) the search results are provided in a ranked order if multiple matching sample codes were found during step vii). This ranking can be based on multiple criteria. For example, during step viii) the labelled authentic sample codes may be ranked higher than non-labelled non-authentic sample codes. Herein, co-related sample codes may be displayed together, for example as a cluster. The sample codes may also be ranked chronologically. During step viii) ranking of the sample codes may be based upon the extent of overlapping of at least one keyword entered and the sample codes stored in the index repository. Additionally, during step vi) a search query may be received comprising multiple keywords, wherein during step viii) ranking of the sample codes is based upon the extent of overlapping of the order of keywords entered and the sample codes stored in the index repository. The order of the ranking criteria set out above can be customized. However, ranking the search results based upon authenticity may be the primary ranking criterion.

Some embodiments further relate to an index repository for use in a method, said index repository comprises at least one sample code compiled by using the above method.

Some embodiments additionally relate to a method for gaining access to specific web content provided with a unique sample code by using a search engine having indexed web content according to the above method, comprising: ix) allowing the search engine providing search results comprising at least one sample code by using the above method, x) selecting at least one sample code listed in the search results by a user, and xi) redirecting the user to the digital location where the web content related to the selected sample code is stored. The sample code itself may directly refer to the digital location where the specific web content associated with the sample code is stored. It is also imaginable that during step xi) the sample code selected during step x) is translated into a cross-referenced digital path, in particular a URL, relating to the digital location where the specific web content is stored. Selecting the sample code by the user according to step x) can be performed manually by copying the sample code into an address bar of a web browser. However, the sample code can also be displayed as a hyperlink to the user, wherein during step x) the user can select the sample code by simply clicking said hyperlink after which the user will be redirected to the digital location where the specific web content is stored.

During the presentation of the search results in accordance with step ix) to recognizable visual distinction may be created between authentic sample codes and non-authentic sample codes so that a user will be able see which results relate to authentic sample codes and which results relate to non-authentic sample codes.

An embodiment moreover relates to a computer-readable medium with computer-executable instructions which, when loaded onto a computer system, provide the computer system with the functionality of the method for compiling a sample code, and/or the method of providing a sample code to specific web content as described above. Examples of computer-readable media are USB-sticks, internal and external hard drives, diskettes, CD-ROM's, DVD-ROM's, and others.

An embodiment additionally relates to a sample code as compiled by the above method. Advantages of the use of a world-wide unique sample code acting as a "fingerprint" have already been described herein.

An embodiment also relates to a database comprising at least one cross-reference between a sample code according to an embodiment and a digital path to a digital location where specific web content associated with said sample code is stored. The use of such a cross-reference table allows the sample code to be converted into a digital path to a digital location where the specific web content can be found.

An embodiment further relates to a system for compiling a world-wide unique sample code using the above method, comprising: at least one sample code template generator for defining at least one sample code template comprising multiple sample code segments to be used for building a sample code for specific web content, said sample code segments at least comprising a sample owner identifying code segment, and a sample identifying code segment, at least one sample code segment specification module connected to said template generator for specifying the content of the sample code segments defined by means of the code template generator, wherein the sample owner identifying code segment is specified by a an address of an owner of the specific web content, at least one code generator connected to said template generator and said specification module for stringing the specified sample code segments to form the world-wide unique sample code, and at least one database for storing at least one cross-reference between a generated sample code and a digital path to a digital location via which access can be gained to the specific web content in case the sample code and the digital path are mutually distinctive. For example, some embodiments of the sample code have already been described herein.

In some embodiments, the system may be a (cloud) computer-implemented system which may be fully automated after proper set-up and initialisation. An embodiment of the system may further include at least one service module for administering the system for issuing a sample code. A digital user/administrator interface for controlling and maintaining the template generator, the specification module, and the code generator are included in the system according to an embodiment. The system may additionally include a sample storage device for storage of specific web content at a digital location of which the digital path is stored in the database. An example of a suitable sample storage device is a web server, optionally in the cloud.

In an embodiment, the system further includes a distribution/communication module for distributing/communicating the generated sample code to one or more users.

Embodiments additionally may relate to a system for handling a request for gaining access to specific web content provided with a sample code according to the above method, comprising: a web client including a search engine for allowing a user to enter a search query, a processing module connected to said web client for processing the search query resulting in search results comprising at least one sample code, and a handling module connected to said processing module for redirecting the user to a digital location of the web content based upon a sample code selected by the user. The functioning of this system has already been described above in a comprehensive manner.

BRIEF DESCRIPTION OF THE DRAWINGS

The following are exemplary, non-limiting embodiments, wherein.

DETAILED DESCRIPTION

Example I

Figure 1:
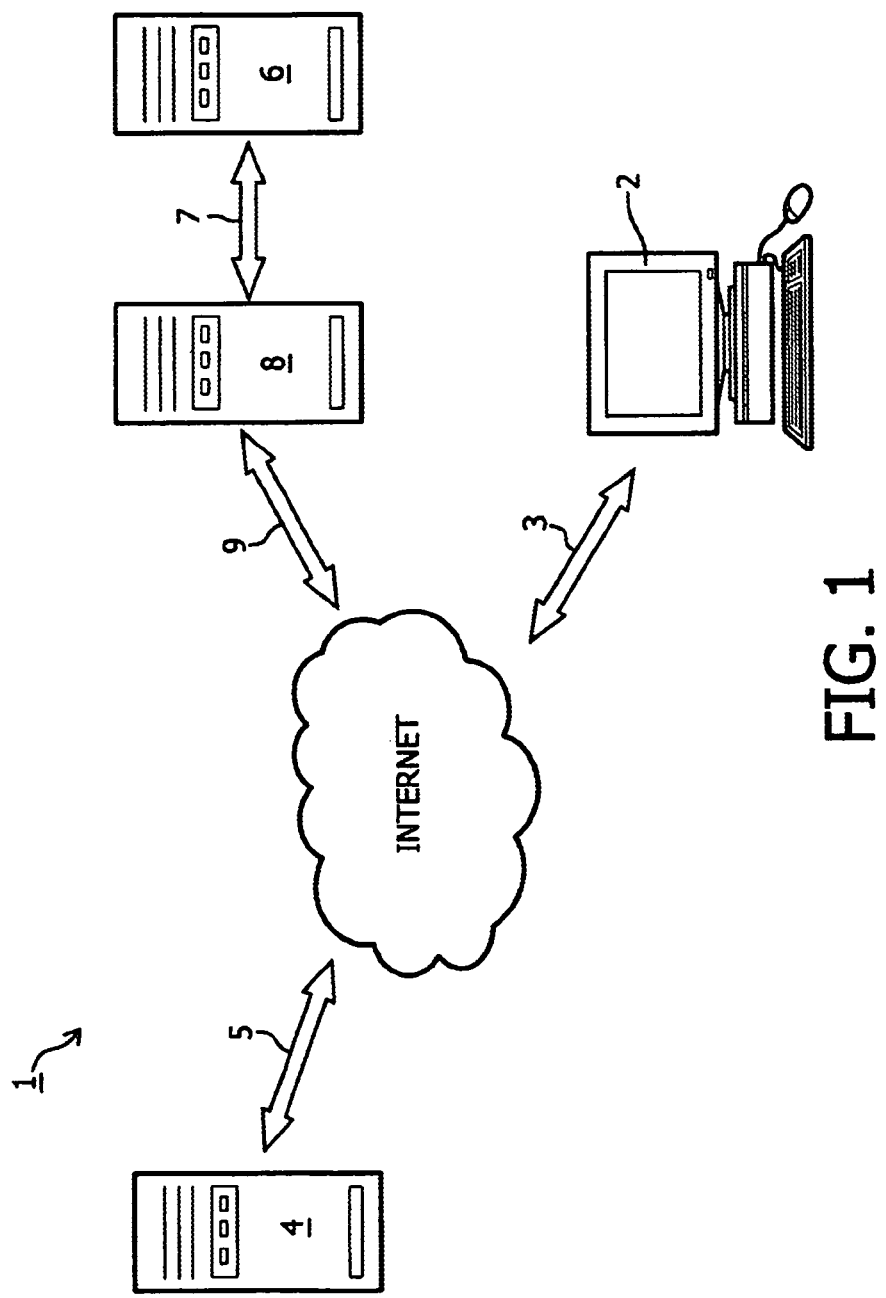
FIG. 1 shows a typical network environment for browsing the Internet according to an embodiment.

FIG. 1 illustrates a typical network environment 1 for browsing the Internet to describe the context of operation according to an embodiment. Here a computer 2 (which could be a mobile device, such as a smart phone) includes an Internet browser and is connected to the Internet via connecting means 3 such as a modem, local area network, or the like, such that it can send and receive data across the Internet. Similarly, a search engine 4 is connected to the Internet via corresponding connecting means 5. Furthermore, a web server 6 publishes web content, such as a web page, and connects via connecting means 7 to an optimising unit 8, which in turn connects to the Internet via connecting means 9. The connecting means 3, 5, 7, 9 may be wired or wireless and may contain nested links or even nested local area networks.

Typically, operation of the network depicted in FIG. 1 may function as follows:

Using the keyboard connected to computer 2, an Internet user types a search phrase, usually consisting of one or multiple keywords, into the Internet browser running on computer 2 and uses the Internet browser to send the search phrase over the Internet to the search engine 4 via the connecting means 3, 5. The search engine 4 receives the search phrase from the computer 2, compares the search phrase with its Internet index and returns results to computer 2 in the form of a web page of hyperlinks that each specify an address on the Internet which the Internet search engine believes contains Internet content corresponding to the search phrase. Using the computer 2, the Internet user selects one of the hyperlinks contained in the results page to retrieve the website page from the web server 6 located at the address specified by the hyperlink, via the optimising unit 8 and the connecting means 3, 7, 9.

Figure 2:
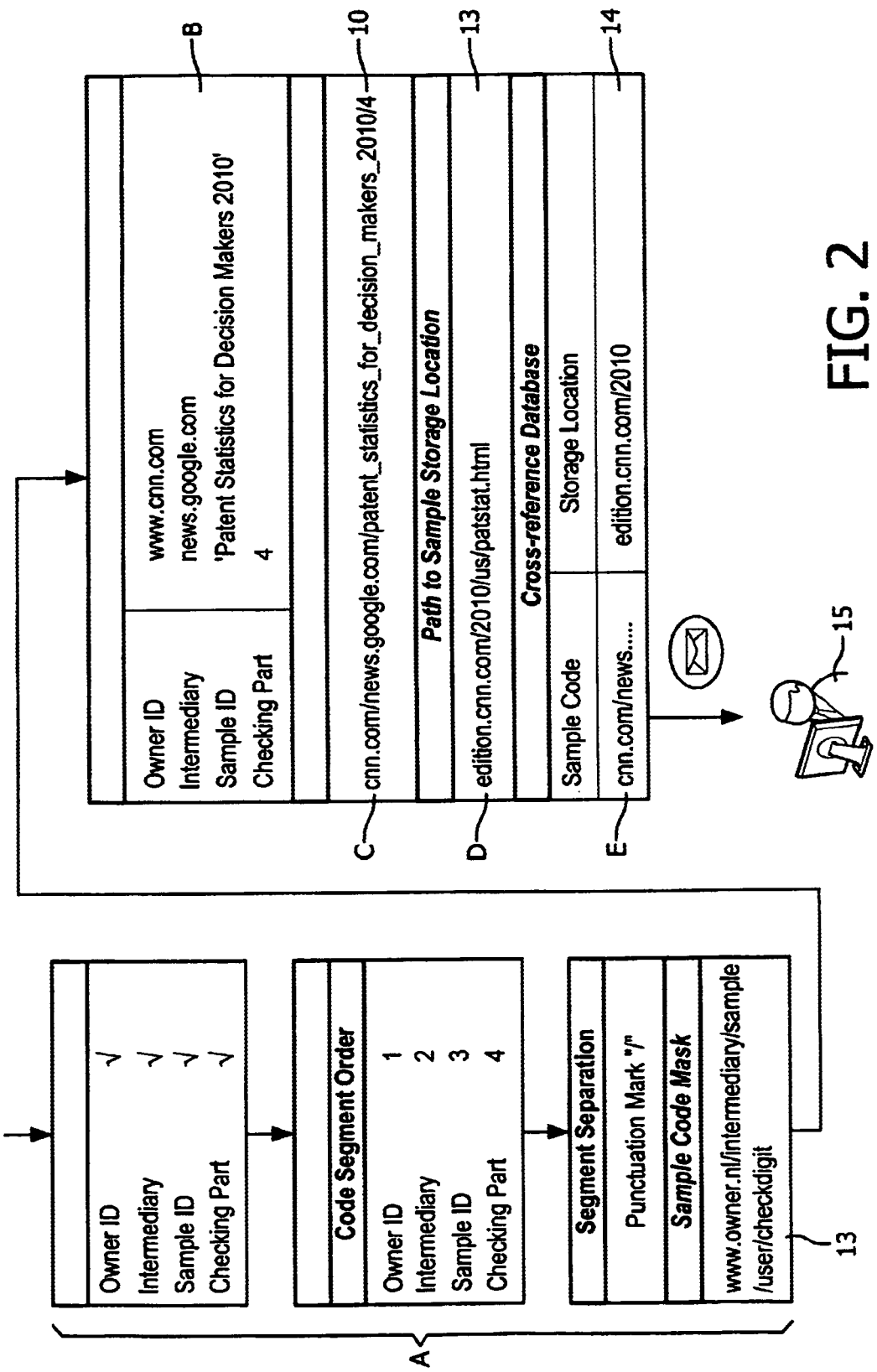
FIG. 2 shows a schematic view of a method for compiling a sample code according to an embodiment.

FIG. 2 shows a schematic view of a method for compiling a sample code 10 according to an embodiment. This method may be executed by a code (compilation) engine. In this embodiment, the sample code 10 is associated with a web document 11 (see FIG. 3) the content of which was composed and created by CNN. By using the sample code 10, the authenticity of the web content can be checked. Moreover, the sample code can be used for indexing the web content by a search engine 12 (see FIG. 4) to facilitate finding the web document 11 on the Internet. Hence, the sample code 10 may function as a "key" to obtain access to the web document 11. Compiling of the sample code 10 is described next. In a first step A) a code template 13 is defined, wherein different code segments are defined for building the sample code. In this specific embodiment, the code segments "Owner ID" and "Sample ID" are necessary, but other code segments are optional. The necessary code segments are used to clarify the origin of the web document 11 (defined in the "Owner ID" code segment) and the relevant metadata, "Patent_Statistics_for_Decision Makers_2010" relate to the content of the web document 11. These metadata may be directly recognizable to a reader or user of the sample code 10. The origin of the web document 10 incorporates an indication of the owner or original publisher of the web document 10 which may be either a present owner (or previous owner) of the web document 10. In this example, additional code segments that may be used include an "Intermediary" code segment relating to an intermediate party via which the specific web document 10 is (also) made public or a "Checking Part" code segment relating to a check digit to control the accuracy or reliability of the sample 10. The order of the selected code segments may then be determined, after which the type of separation mark is chosen to separate adjacent code segments. The selected and ordered code segments separated by a separation mark, collectively form the code template 13. In a next step B) the code segments of the code template are specified. As shown in FIG. 1 the "Owner ID" code segment is specified with www.cnn.com, indicating that the web document 11 is published by and legally belongs to the original owner CNN. Google News is used as an "Intermediary" to offer the web document 11 to the public in this example. The web document 11 within the CNN environment is uniquely coded with "Patent_Statistics_for_Decision Makers_2010". The "Checking Part" specification is the result of mathematically processing of other characters of the sample code 11 and is commonly automatically filled in. Applying these specified code segments into the code segment template 13 (step C) can result in the sample code 10: "cnn.com/news.google.com/Patent_Statistics_for_Decision Makers_2010/4". This sample code 10 is unique world-wide and can be used as a unique web key to obtain access to the desired web document 11. In this example, the web document 11 is stored at a web location having a different web address 14 (edition.cnn.com/2010/us/pastat.html) than the web address 10 (cnn.com/news.google.com/Patent_Statistics_for_Decision Makers_2010/4) represented by the code sample 10 (step D). A cross-reference between both web addresses may be stored in a cross-reference database 14 (step E). The sample code 11 is sent by email to the user 15.

Figure 3:
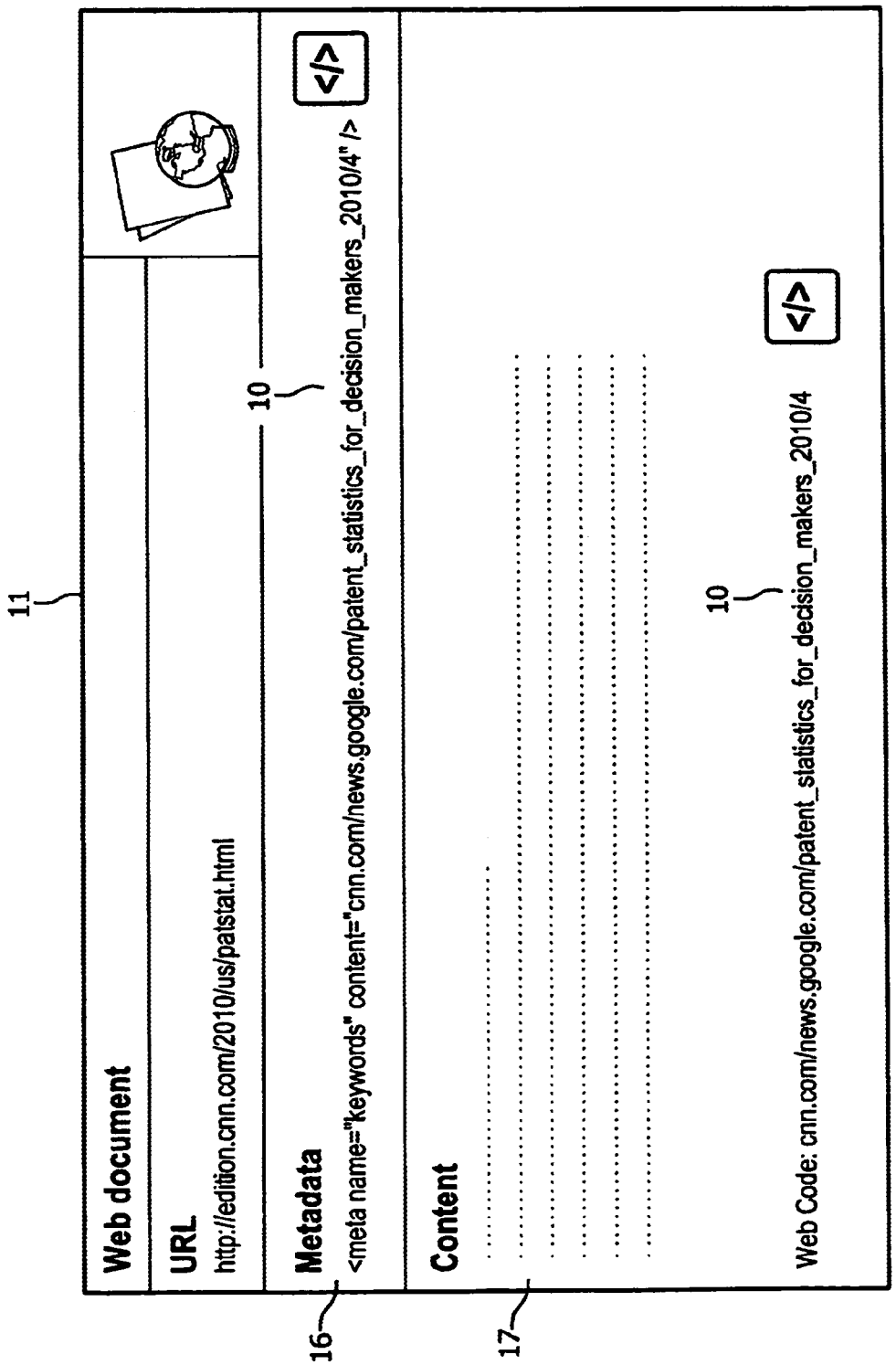
FIG. 3 shows a schematic view of a web document provided with the sample code according to FIG. 2 according to an embodiment.

FIG. 3 shows a schematic view of the web document 11 provided with the sample code 10 according to FIG. 2 according to an embodiment. As shown in this figure, the web document 11 is published by CNN and can be found via the URL: http://edition.cnn.com/2010/us/patstat.html. In this embodiment, the sample code 10 is incorporated both as metadata 16 and in the body text 17 of the web document 11.

Figure 4:
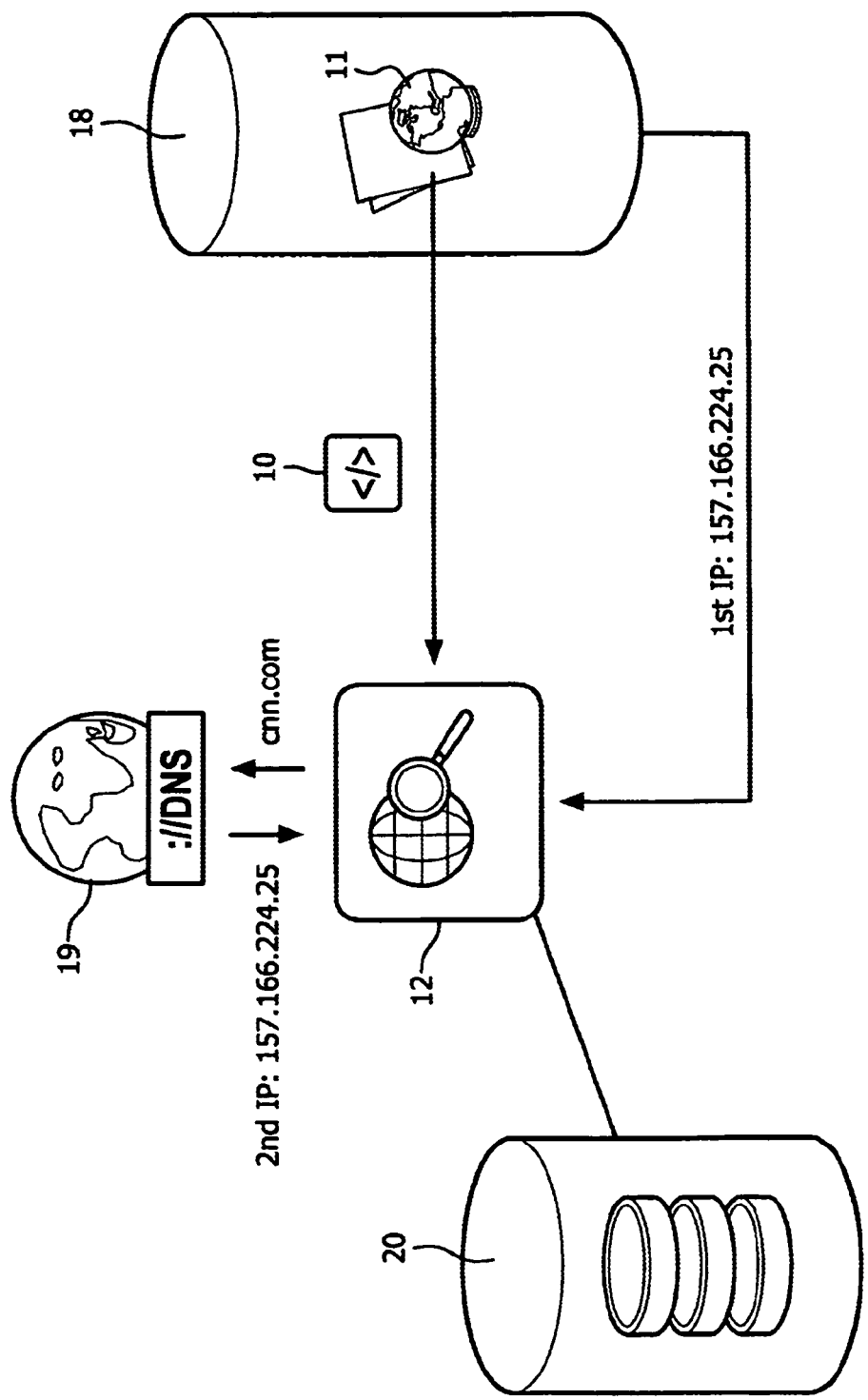
FIG. 4 shows a schematic view of indexing the web document according to FIG. 3 by a search engine according to an embodiment.

FIG. 4 shows a schematic view of indexing the web document 11 according to FIG. 3 by the search engine 12, such as Google, Bing, or Yahoo according to an embodiment. The web document 11 is stored on and published by a CNN web server 18. A web crawler of the search engine 12 may periodically screen the Internet for new sample codes 10. In case a new sample code 10 is found, the sample code 10 may be downloaded by the search engine 12. Additionally, the search engine 12 will detect the IP address of the web server 18 publishing the web document 11. In this example, the IP address of the CNN web server is 157.166.224.25 ("$1^{st}$ IP"). The sample code 10 downloaded by the search engine 12 is analysed, wherein the owner identifying part, which may comprise a domain name (here: "cnn.com"), is submitted to a Domain Name Server (DNS) 19 in response to which the IP address associated with the particular domain name can be found. In this case the IP address provided by the DNS 19 is identical to the $1^{st}$ IP: 157.166.224.25 ("$2^{nd}$ IP"). Since "$1^{st}$ IP" and "$2^{nd}$ IP" are identical, the web document 11 is considered to be published by the legal owner (CNN) of the web document 11, as a result of which the web document 11 is considered to be authentic. The sample code 11 together with an authenticity label is stored as index entry in an index repository 20 making part of the search engine 12. Other methods of determining authenticity can also be used.

Figure 5:
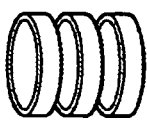
FIG. 5 shows a view of the content of an index repository generated by the search engine according to FIG. 4 according to an embodiment.

FIG. 5 shows a view of the content of the index repository 20 generated by the search engine 12 according to FIG. 4 and according to an embodiment. The above sample code 10 is stored as index #1 in this embodiment ($1^{st}$ column). The search engine 12 stores the sample code 10 in a decomposed format ($2^{nd}$ column), wherein all code segments are stored separated from each other. In this decomposed format the original separation character (slash sign) has been removed from the sample code 10. This helps facilitate exclusion of selective code segments, such as the checking code segment, from searching ($3^{rd}$ column), which may improve the searching efficiency of the search engine. Moreover, each code is given a time stamp ($4^{th}$ column) to facilitate chronological ranking of search results. The sample codes 10 associated with web documents 11 found authentic are additionally labelled with the IP address of the owner of the web document 11 ($5^{th}$ column).

Figure 6:
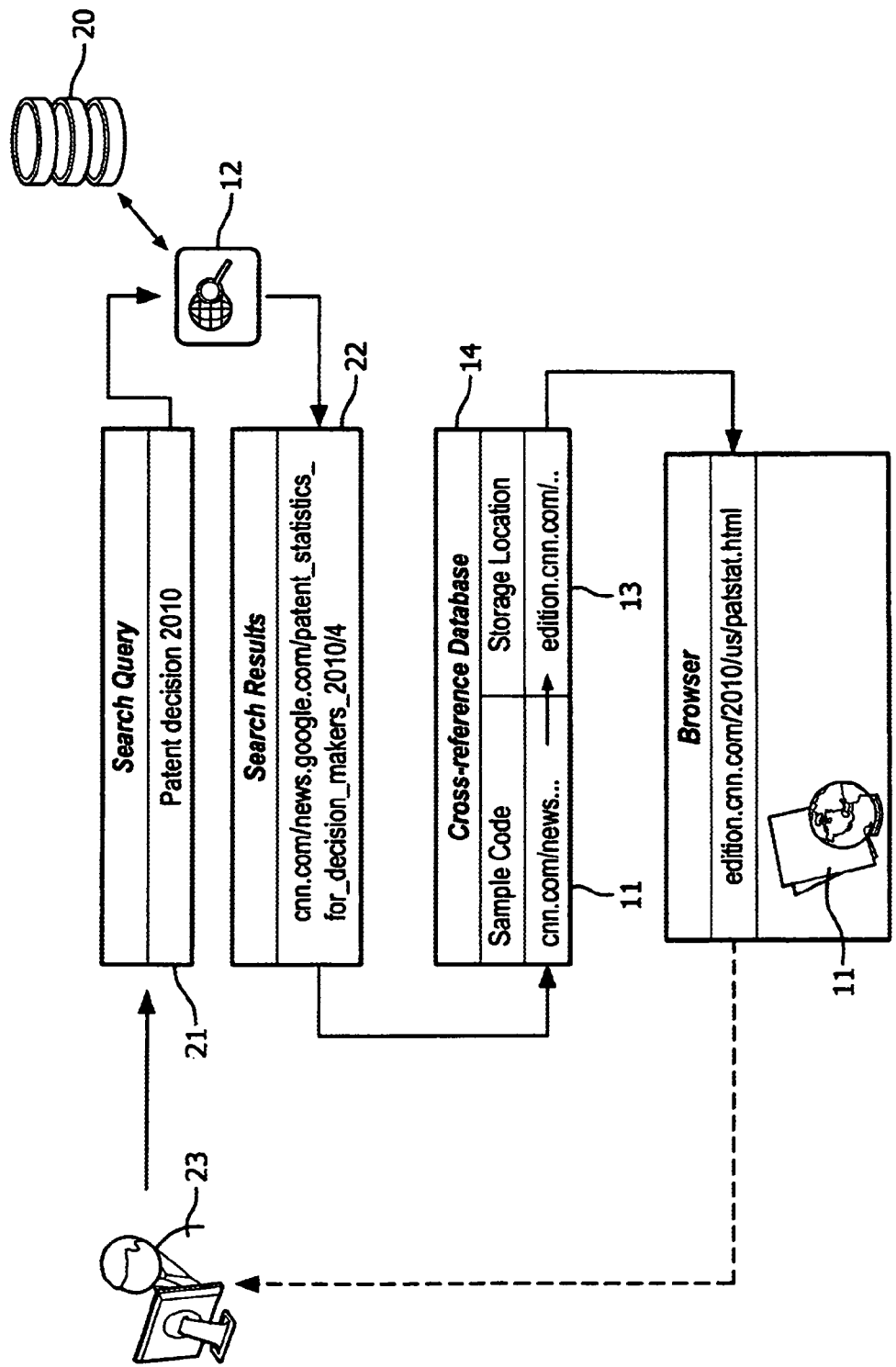
FIG. 6 shows a schematic view of processing of search query by the search engine according to FIGS. 4 and 5 according to an embodiment.

FIG. 6 shows a schematic view of processing of a search query 21 by the search engine 12 according to FIGS. 4 and 5 and according to an embodiment. The search query 21 commonly consisting of one or more keywords, is entered into a search field of the search engine 12 upon which the index repository 20 is searched for the search query leading to search results 22. The search results 22 comprise a list of sample codes 10 that partially or fully match the search query 21. The matching sample codes 10 are shown as hyperlink. By clicking the sample code 10 by a user 23, the user 23 will be automatically redirected, by using a web script, to the cross-reference database 14 commonly stored on the CNN web server 18 and subsequently redirected to the storage location (URL) 13 which is cross-referenced to the sample code 10, as a result of which the user will obtain access to the web document 11 as requested.

Example 2

The following example shows a fictitious sample code for an existing book.

The sample code reads as follows: "www.springer.com/ComputerScience/FeaturedBooks/D.Solomon-G.Motta/HandbookOfDataCompression/5Ed/2010/5436"

The first part of the code is the publisher as legal owner of the book. The following segments are parts of the identifier of a particular book (=sample) within the scope of Springer, the 5436th exemplar of the 5th edition, edited in 2010, of David Solomon's and Giovanni Motta's Handbook of Data Compression. It is categorized by Springer as featured book of subject Computer Science. The owner segments (www.springer.com) together with the rest of the code segments make the code unique.

The code could integrate the state of the art ISBN coding within the referred sample code:

"www.springer.com/ComputerScience/FeaturedBooks/D.Solomon-G.Motta/HandbookOfDataCompression/5Ed/2010/978-1-84882-902-2/5436". The ISBN-code does not code a particular sample of the mentioned book, but only the edition (product series). Optionally, the code may be extended with the name of the transfer protocol such as "http://".

The sample code is stringed from ordered segments. Each segment value and/or values of several successive segments are keywords describing the sample. Because the string as a whole identifies the sample, the keywords as a whole (the whole code string values for example, in the given order) may be used as the index term and related to the sample and/or its (additional) data e.g. in an inverted index or in the indices used by meta search engines. If applied, the domain name part of the sample code will be translated into an IP-address and stored as data cross-referenced to the index term; this only after examining that the IP-address is the legal IP-address of the domain name. If the IP-address is not applicable, another digital address may be stored, according to other conventional Internet addressing and verification means. If the evaluation of the IP-address according to the composed index term results in a non-match between the expected and the factual IP-address, the composed index term is saved according to the rest of the processing, however this is done without a cross reference to the owner's IP-address. If the file has some content related to the coded sample, it may not be created by the legal owner.

Example 3

Figure 7:
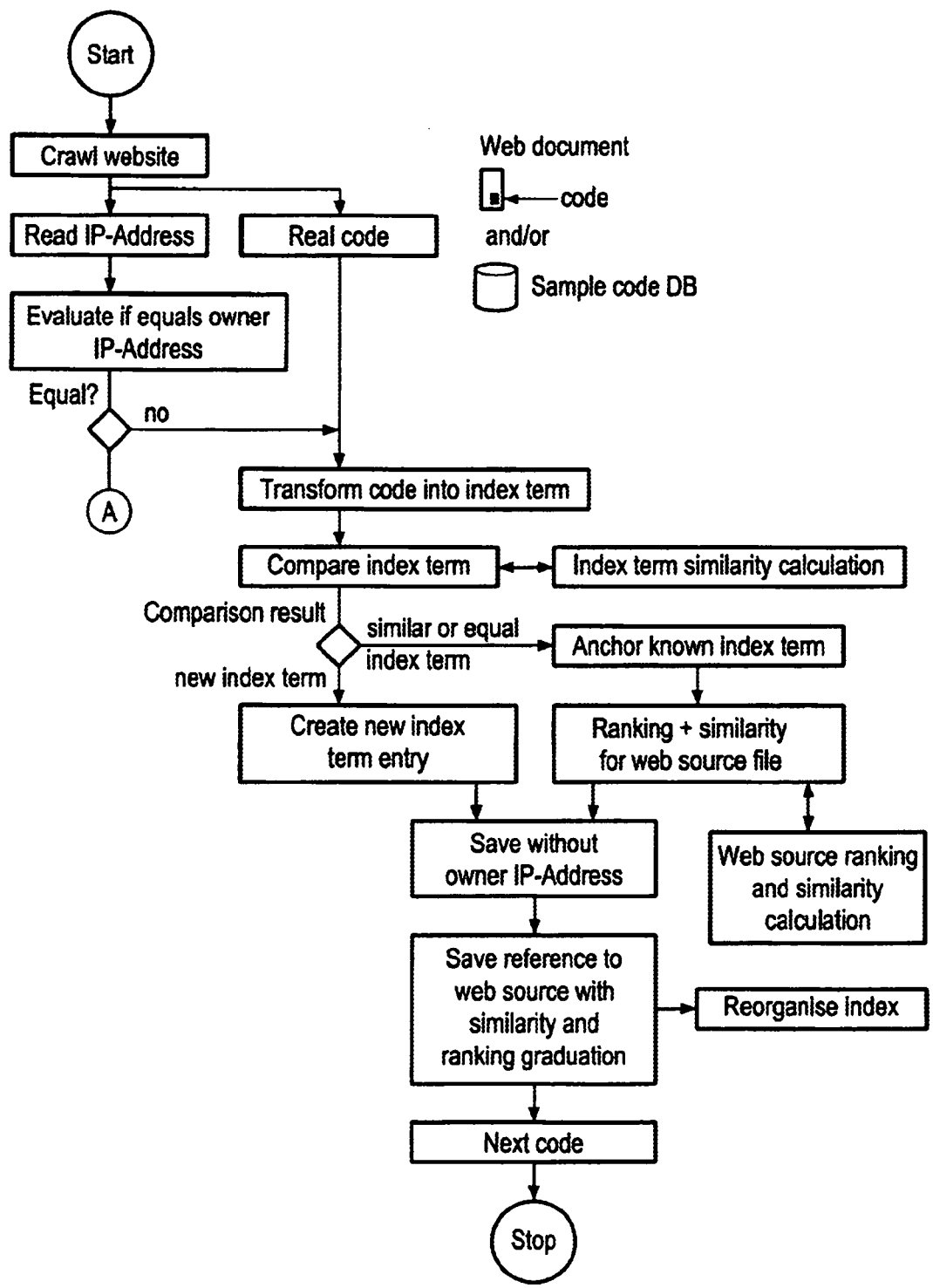
FIG. 7 shows a schematic view of a processing of a sample code by a search engine according to an embodiment.

The processing of the sample code in its transformed representation as composed index string aiming indexing and ranking files is illustrated in FIG. 7 according to an embodiment.

During the crawling of websites, and also directly in databases with sample codes, the sample codes are read. In addition, the IP-address of the website or the IP-Address of the owner are also as saved in the sample code DB, which is related to a particular code. Enabling reading of the sample codes directly from a sample code DB provides additional functionality to merely crawling the website. For example, reading a sample code can indicate that certain files have not been crawled on websites, e.g. files with news-content which may constantly change. Similarly, if there is no new sample code, it may be assumed that nothing has changed (e.g. the file with news-content has not been updated. The IP-address reproduced from the code's legal owner part (domain name) is compared with the read IP-address of the website. If both are equal, the processing continues with (A). Otherwise, it is assumed that the file's content refers to the sample code, but that the file is not created by the legal owner of the sample. Also in this case, the reference to the file refers to the index term.

The index term in this instance may be composed from several terms, organized as e.g. a string, and handled or processed as one index term.

At first, the code is transformed into a composed index string. Then, the composed index string is compared with existing index strings applying similarity parameters and conditions. If no similarity or equality can be recognized, it is concluded that the composed index term is new in the scope of the existing index. The index, containing the index terms, is a structure to support ordering and finding index terms. The index term may be saved, however without a cross-reference to an owner IP-address, as there was no match between the IP-address derived from the sample code and the IP-address of the website. If a match was made, the existing index term is anchored, and the reference to the information source file as well as similarity parameters and ranking graduation is stored to refer to the anchored index term. Reorganization of the index can happen in parallel or later time according to the particular maintenance strategy that is employed.

Figure 8:
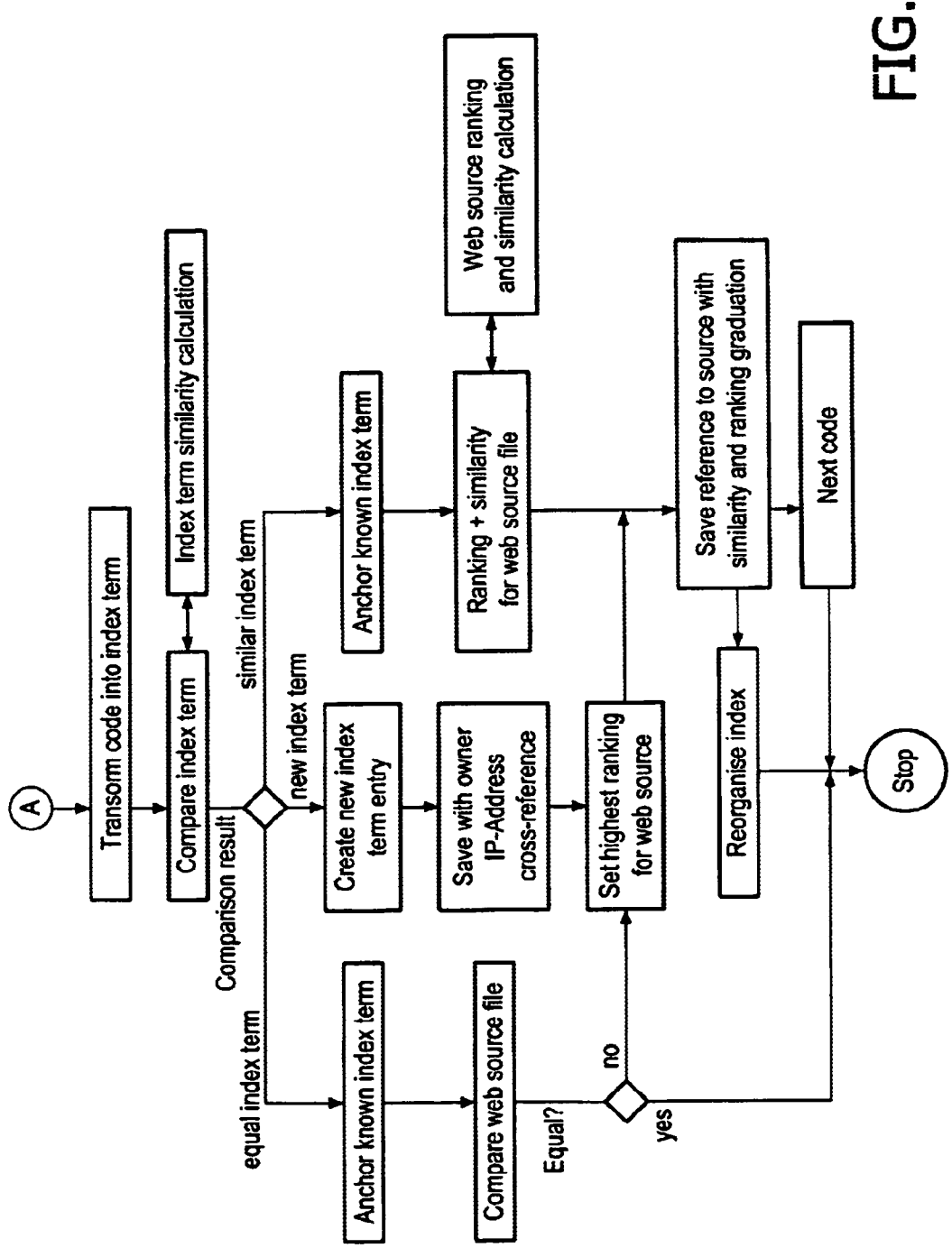
FIG. 8 shows a schematic view of the comparison of IP-addresses to determine the authenticity of web content related to said IP-addresses according to an embodiment.

The symbol A in a circle in FIGS. 7 and 8 defines the location where the flow chart of FIG. 8 continues from FIG. 7.

If the comparison of the IP-addresses results in "equal", it is assumed that the files containing a sample code was created by its legal owner. FIG. 8 illustrates this process in more detail, with some of the steps being the same as previously described in FIG. 7 according to an embodiment.

At first, the code is transformed into a composed index term. Next, the composed index string is compared with existing index strings applying similarity parameters and conditions. If no similarity or equality can be recognized, it is concluded that the composed index term is new in the scope of the existing index. The index term may be saved with the cross-reference to its owner IP-address. It receives the highest ranking automatically, because it is assumed to be created by the owner of the sample and therefore being the digital sample itself or being an additional information source file on a sample (such as a physical or digital sample). The latter one can be found before the coded digital source (file) is found. For the index, there is no differentiation between those types of files related to a sample/containing the sample, but other embodiments may use another form of differentiation. Both are coded the same and have the same legal and confirmed creator.

If the evaluated composed index term is similar to an existing composed index term, the existing index term is anchored, and the reference to the source file as well as similarity parameters and ranking graduation is stored referring to the anchored index term.

If the evaluated composed index term is equal to an existing composed index term, the existing index term is anchored. Subsequently, it may be determined if the file that is containing the sample code according to the composed index term is already known in the search engine. If so, no action needs to take place. If not, it is assumed that the file is a legal file on the coded sample or the coded digital sample. It also receives the highest ranking in accordance with the assumptions. As aforementioned, the maintenance of the index may occur according to a maintenance strategy that is independent from the creation and evaluation of the index term.

If a file's code matches an existing index term, it may come up as the highest priority search result especially if it contains keywords in the same order as in the composed index term and if the IP-address of the location of files of the search results is the same as in the legal owner segments of the composed index term. The sample code could be contained in the meta-tag of the file(s) representing the sample. They could be contained in addition to or solely embedded in the file as a kind of digital watermark. In this embodiment all the other files that partially contain the keywords, contain the keywords in a non-successive manner, and/or fully contain the keywords in a different order may receive lower priorities according to the gradation of matching the composed index term equal to the code values. The "equals operation" may include appropriate correction and accounting for spelling mistakes; however synonyms or other similarities may be excluded for the legal owner part of the composed index term. The composed index term in different languages or character sets may be considered to be equal to each other.

Similar to an inverted index, the source files containing the found composed index term are referenced as source of the term with the highest priority. Not all parts of the composed index term are used for lower ranked files that are still included in the referencing process. Which parts of the composed index are considered for lower ranking files may be due to the ongoing results of a learning algorithm. In general, however, the identifying part of the composed index term that identifies the legal owner will typically be considered.

Files with keywords even identical or nearly identical to the composed index, but found on a site with a different IP-address as cross-referenced for the original composed index term get a lower ranking in an inverse order compared with the files having the same IP-address than the index term source. For example, if the IP-address is not a legal IP-address of the original owner and if the extracted keyword string is similar to the original, indexed one, then the file may be assigned a lower ranking according to the search index.

If a code contains a date-time segment, then it may contain a hint or a segment defining the location where the time refers to or the time zone. This relationship between data-time and time zone may be kept in the composed index string too. Due to the 1:1 mapping of the code string's segment terms and the parts of a composed index term this may be easily implemented.

A composed index term based on a sample code is different from an index term from a controlled vocabulary. The latter one, predefined as a term in a similar manner as a thesaurus or taxonomy, would be used as search index. The composed index terms based on sample codes are not predefined in a search index. They are inserted into the index when crawled, and are dynamically updated. Thus, a sample code pre-coordinates the search and its result, even if it is not a predefined index term.

Figure 9:
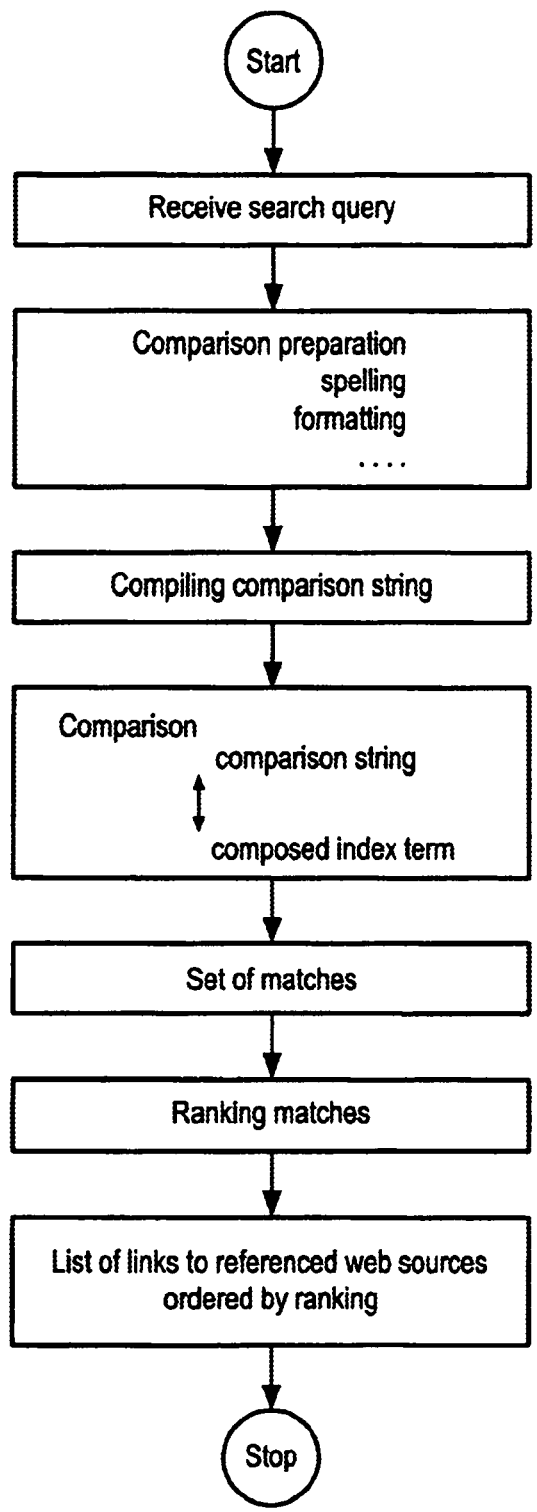
FIG. 9 shows a schematic view of how a search query is processed by the search engine according to an embodiment.

FIG. 9 illustrates an example of how a search query can be processed by the search engine according to an embodiment. The search query, which was inserted in the browser, is received in the search term reading mechanism of the search engine. Following, the query is prepared for the comparison process. This preparation includes at least spelling correction and formatting. Check and removal of spelling mistakes has to be done in a way that owner domain names and brand names are not changed unintentionally. The comparison string may then be compiled. The comparison string is another representation of the search query, and may be used to support a simple handling process to compare the search query terms with the composed index terms. After string compilation, a comparison process may begin to find the composed index terms or parts of composed index term, respectively, which match the comparison string. To define if a match is found, the similarity criteria is applied as used for defining similarities between index terms. The result is a set of matches: similar or equal composed index terms and their related sources. Because the comparison string could be similar to the composed index string, the related sources may generally match the search query in a graduated ranking order. Thus, the engine has to produce a ranking of the matching sources and their URLs and show this ordered matching list in the browser. If a (full) code is inserted as a search query, the code equals the full composed index term and the referenced source files are highest ranking; thus, the link may be made directly to the intended sample location on the net. In general, the domain name part of a composed index term gets the highest priority during match building, followed by the intermediate priority portions, and the rest is handled according to the comparison conditions and parameters (Condition parameter DB).

Figure 10:
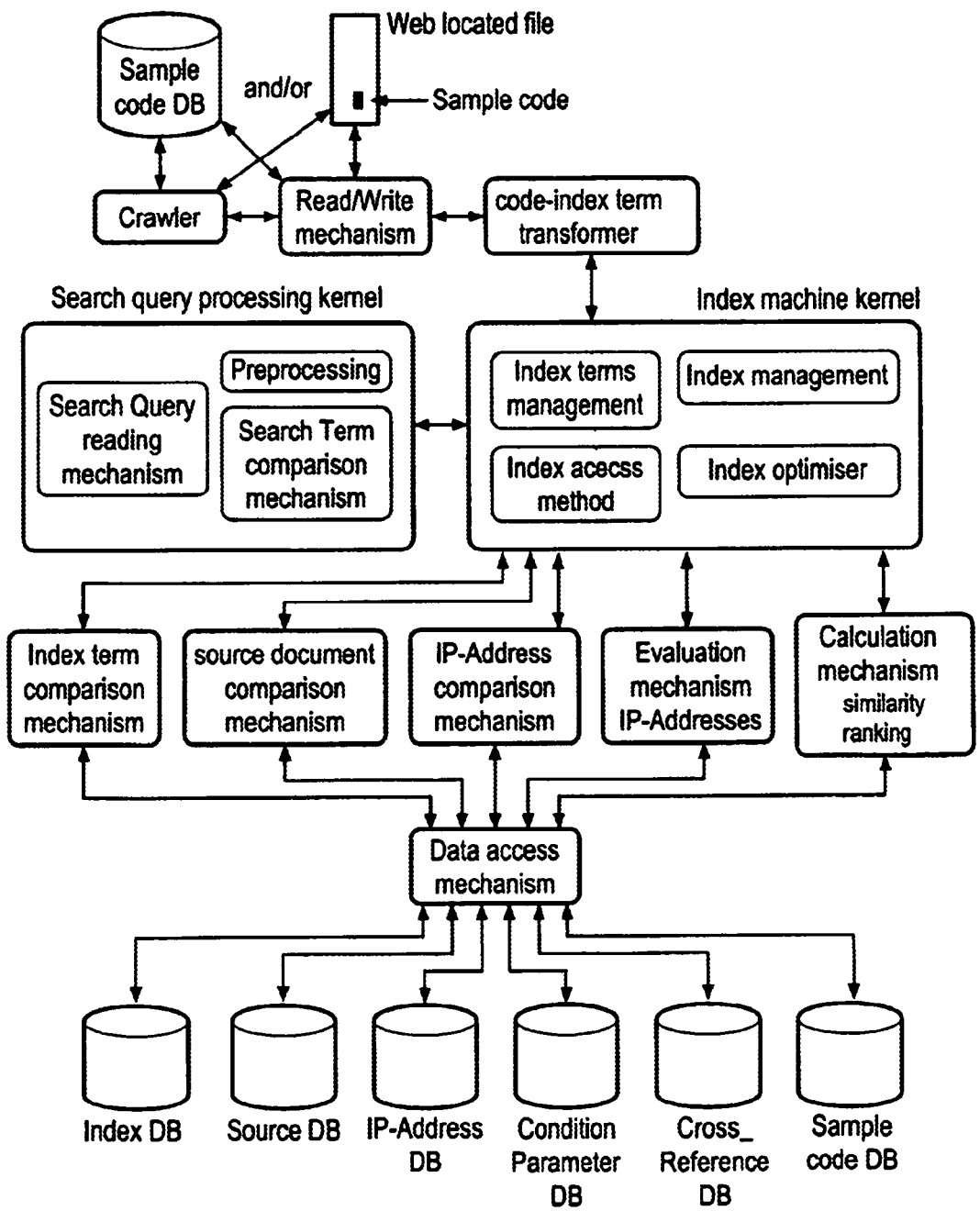
FIG. 10 shows an overview of the main building blocks of a system supporting the described indexing method according to an embodiment.

FIG. 10 illustrates the main building blocks of a system supporting the described indexing method according to an embodiment. The following databases may be part of the system:

An index repository,
Sources (as far they are saved in the search engine),
IP-addresses and relationships with domain names,
Conditions and parameters for similarity and ranking calculations, Cross-references between index entries and legal owner IP-Addresses, Database (DB) comprising sample codes.

The databases may be accessed via a data access mechanism.

The next upper layer represents building blocks from the business logic layer, including:

Index term comparison mechanism,

Source file comparison mechanism,

IP-Address comparison mechanism,

Evaluation mechanism for recognizing the legal IP-Address,

Calculation mechanisms for similarity and ranking calculations.

The next upper layer represents the index machine kernel, which may include the following building blocks:

Index term management,

Index access method,

Index management following a maintenance strategy,

Index optimised.

The upper part of FIG. 10 shows the building blocks enabling finding of sample coded files and preparing for indexing, which may include:

Crawler,

Read/Write mechanism,

Code-Index transformer.

The search query processing kernel reads the search terms, pre-processes the terms to remove spelling mistakes, and transforms them in a format enabling comparison with the composed index terms. Other additional steps may also be added. The building blocks may include:

Search query reading mechanism,

Pre-processing,

Search term comparison mechanism.

Example 4

A web document (file) describing shoes from type Hiking4 of brand Sportshoes and their manufacturing—coded and specified by www.sportshoes.com/hiking4/manufacture/countryC/townT/2010—will produce the composed index term: www.sportshoes.com hiking4 manufacture countryC townT 2010, cross referencing IP-address 81.218.134.123, where the cross-referencing is also part of the composed index term.

The site with the file or the file itself may contain options to access data on the particular shoes. However the data can otherwise be reached directly and in a straightforward manner by reading the code as barcode from the iconised representation fixed to each shoe e.g. with a barcode scanner or inserting the code string into a browser.

Another file with the same keywords in the same order may be referenced with the same ranking for the same composed index term.

Another file with the same keywords, however not in the same order, may be referenced for the same composed index term, however with a lower ranking.

Example keyword string in the other file: "hiking4 sportshoes countryC townT 2010 manufacture".

Other files with part of the keywords may be referenced too; however again with lower rankings.

Examples for considered strings of keywords: "sportshoes hiking country", or "hiking sportshoes manufacture 2010".

A file containing the keyword string "hiking4 countryC townT 2010" would not be considered for referencing by the composed index term. A file containing only www.sportshoes.com would be considered for referencing.

A file containing www.sportshoes.com hiking4 manufacture countryC townT 2010, however with an IP-address 81.218.136.127 would be ranked lowest. That is because it uses data about a sample of owner sportshoes, but is not a legal representative of this company following an IP check resulting in mutually distinctive IP-addresses. As the keyword string is similar to the original one and the IP-address is not a legal IP-address of the original owner, it may have a lower ranking according to the search index, as previously mentioned.

Which file, referenced by the composed index term, will be shown as part of the search query depends on the query. One realization of a ranking algorithm, based on the composed index term and its original ranking, could be as follows: If the query contains only "sportshoes" all files will be shown; here in a ranking reverse to the one according to the first index prioritisation. The search query is very general, thus the result expected is very general. Files with a high ranking for the composed index term are very special and are supposed to have a low ranking concerning a general query. If a query contains "sportshoes, hiking" all files are shown in a ranking due to the start with "sportshoes" and hiking at second place, then hiking4 at the second place, then hiking at the third place, etc. If the query contains "sportshoes, hiking4" or "hiking4, sportshoes" the original ranking is used for showing the results.

Example 5

Suppose a newspaper page coded as

"www.newspaper.com/page01/column03/12052010" (more precise code) as the newspaper page of day 12th of May 2010. The page may have several categories like economy, politics, culture, sport, showbiz, technique, etc. Each of these categories will contain several news articles and images, etc.

Each category of the newspaper has its own code because it is considered to be a sample; examples:

www.newspaper.com/12052010/economics www.newspaper.com/12052010/politics www.newspaper.com/12052010/sport However, the www.newspaper.com/12052010/culture code may not exist because the newspaper of Dec. 5, 2010 contains no culture section in this exemplary embodiment.

The example codes of the newspaper samples will produce the following composed index terms:

www.newspaper.com 12052010, cross referenced IP-address x.x.x.x, which is considered as the legal IP-address of "newspaper" in this embodiment.

www.newspaper.com 12052010 economics www.newspaper.com 12052010 politics www.newspaper.com 12052010 sport and all three having a cross reference to IP-address x.x.x.x.

Each of the newspaper articles and images placed under a category of the newspaper of the given date is a sample (specific web content) in its own right. This means, its sample code has amongst others an owner segment; e.g. the person who created the article or the agency that initiated the creation of the article, image, etc. Suppose an article about the role of Gordon Brown during the election in the UK from 10th of May 1:30 p.m. is created by Reuters, and the article is considered as digital sample and the sample code is www.reuters.com/UK/election2010/GordonBrown/100520100130pm If the article was placed on the Reuters website, the search engine of some embodiments of systems and methods described herein would find the article and produce the composed index www.reuters.com UK election2010 Gordon-Brown 100520100130pm, cross referenced with the IP-address of Reuters.

The index need only to be renewed if an article contains the keyword string with a different date-time part. In that instance, a new article from Reuters concerning the same subject may have been written, with the subject expressed by its code:

www.reuters.com/UK/election2010/GordonBrown and its composed index:

www.reuters.com UK election2010 GordonBrown.

There could be a policy to show only the newest article as a search result on a query containing "www.reuters.com UK election2010 GordonBrown" or a part of it. Alternatively, the policy could also be to show a list with all articles related to this subject, separated from each other by the date-time segment of the codes.

If an article is found containing the same composed index string as already known and owned by the same owner (having the legal owner's IP-address), it has to be evaluated if the article is a copy of the first one or an additional article to the same sample; in this case a content comparison has to be done. If the article is different, its reference may be saved related to the composed index string and shown as a search result with the highest priority if the index term as whole is queried.

If Newspaper.com buys this article and places its copy of the article in the politics category of its website, then the article's code may then be extended to:

www.reuters.com/newspaper.com/politics/UK/election2010/GordonBrown/100520100130pm.

The part "newspaper.com/politics" indicates the identity of the intermediary and the categorization applied to the article according to the intermediary. This copy of the article is watermarked by the extended code. The search engine of some embodiments described herein produces a composed index as www.reuter.com newspaper.com politics UK election2010 GordonBrown 100520100130pm, now cross referencing to the IP-address of "newspaper".

The index term of the original article and the index terms of the intermediary are referenced in the search engine index database and all legal locations may be ranked high and shown high ranked if queried.

The codes and the code containing news files may be found on the website of Newspaper or Reuters. However, there may also be an agreement that the search engine can find those codes in the particular sample code DB's of the news agency or the news redaction, etc. If the code sample DB is accessed directly by the search engine, it would find code www.reuters.com/newspaper.com/politics/UK/election2010/GordonBrown/100520100130pm and index and rank it. The search engine does not have to "worry" about a missed news article about the subject "politics, UK, election 2010" and even "politics, UK, election 2010 Gordon Brown". Other news may only be found in case a new sample code is created, e.g. www.reuters.com/newspaper.com/politics/UK/election2010/GordonBrown/100520100245pm.

It should be noted that the above-mentioned embodiments illustrate rather than limit the invention, and that those skilled in the art will be able to design many alternative embodiments without departing from the scope of the appended claims. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be advantageously used.

The invention claimed is:

1. A method for compiling a unique sample code for specific web content, comprising:
    defining at least one sample code template comprising multiple sample code segments to be used for building a sample code for specific web content, said sample code segments at least comprising:
        a sample owner identifying code segment, and
        a sample identifying code segment;
    specifying the content of the sample code segments to be used for building said sample code, wherein the sample owner identifying code segment is specified by an Internet address of an owner of the specific web content;
    stringing the specified sample code segments to form the sample code;
    defining a digital path to a digital location via which access can be gained to the specific web content and which is mutually distinctive from the sample code;
    creating a cross-reference between the sample code generated during the stringing of the specified sample code segments and the digital path defined during the defining of the digital path; and
    providing the sample code with a time stamp indicating a time dependency of the specific web content.

2. The method according to claim 1, wherein the digital path represents a Uniform Resource Locator (URL).

3. The method according to claim 1, wherein the digital path refers to a digital location where the specific web content is stored.

4. The method according to claim 1, wherein the method comprises storing the sample code, the digital path, and the cross-reference between the sample code and the digital path in a database.

5. The method according to claim 1, wherein the method comprises converting the sample code into a machine-readable format.

6. The method according to claim 1, wherein the method comprises translating at least the sample identifying code segment of the sample code into another language.

7. The method according to claim 1, wherein the identifying code segment comprises at least one keyword relating to the specific web content.

8. The method according to claim 1, wherein the sample code segments further comprise an intermediary code segment.

9. The method according to claim 1, wherein the sample code segments further comprise a checking code segment representing the result of a predetermined mathematical processing of at least one other sample code segment.

10. The method according to claim 1, wherein the sample code segments further comprise a sample code security identifying code segment.

11. The method according to claim 1, wherein the specific web content is stored at a web location having a different web address than a web address represented by the sample code.

12. The method according to claim 1, further comprising providing the sample code with a segment defining a location to which the time stamp refers.

13. A method for indexing specific web content provided with a sample code, comprising:
    allowing a search engine to crawl specific web content and acquiring at least one sample code coupled to said specific web content;
    detecting an Internet address of a web server publishing the web content;

verifying the authenticity of the sample code by comparing an Internet address incorporated in an owner identifying code segment of the at least one sample code with the detected Internet address of the web content;
providing the sample code with a time stamp indicating a time dependency of the specific web content;
labeling sample codes that were verified as authentic; and
storing the sample codes acquired in an index repository.

14. The method of claim 13, wherein the method further comprises:
detecting the IP address of the web address prior to the process of verifying the authenticity of the sample code;
wherein during the process of verifying the authenticity of the sample code a domain name is derived from the owner identifying part of each sample code;
wherein an IP address related to said domain name is looked up using a domain name server; and
wherein the looked up IP address is compared with the detected IP address.

15. The method of claim 13, wherein a ranking of the sample codes is based upon the extent of overlapping of the at least one keyword entered and the samples code stored in the index repository.

16. The method according to claim 13, wherein the storing the sample codes acquired in an index repository comprises decomposing the sample codes into separate code segments and storing the sample codes in the decomposed format.

17. The method of claim 13 further comprising:
receiving a search query comprising at least one keyword;
searching the sample codes stored in the index repository for the at least one keyword; and
in case the at least one keyword matches at least a part of at least one sample code stored in the index repository, providing the at least one matching sample codes as search results.

18. The method of claim 17, wherein the search results from searching the sample codes stored in the index repository are ranked in the event that multiple matching sample codes are found.

19. A system for compiling a unique sample code, comprising at least one sample code template generator for defining at least one sample code template comprising multiple sample code segments to be used for building a sample code for specific web content, said sample code segments at least comprising a sample owner identifying code segment, and a sample identifying code segment;
at least one sample code segment specification module connected to said template generator for specifying the content of the sample code segments defined by means of the code template generator, wherein the sample owner identifying code segment is specified by an Internet address, in particular an IP address and/or a domain name, of an owner of the specific web content;
at least one code generator connected to said template generator and said specification module for stringing the specified sample code segments to form the sample code; and
at least one database for storing at least one cross-reference between a generated sample code and a digital path to a digital location via which access can be gained to the specific web content and providing the generated sample code with a time stamp indicating a time dependency of the specific web content, wherein the generated sample code and the digital path are mutually distinctive.

20. The system according to claim 19, wherein the system further comprises a sample storage device for storage of specific web content at a digital location of which the digital path is stored in the database.

21. The system according to claim 19, wherein the system further comprises at least one service module for administering the system for issuing a code.

22. The system according to claim 19, wherein the system further comprises a digital user interface for controlling the template generator, the specification module, and the code generator.

23. The system according to claim 19, wherein the system further comprises a communication module for communicating the generated sample code to a user.

* * * * *